United States Patent [19]  [11] 3,953,271
Matsuda et al. [45] Apr. 27, 1976

[54] PROCESS FOR THE PRODUCTION OF ARTIFICIAL LEATHER HAVING A CREPE PATTERN

[75] Inventors: Yujiro Matsuda; Kazuchika Nakamura, both of Kyoto, Japan

[73] Assignee: Kawashima Orimono Co., Ltd., Kyoto, Japan

[22] Filed: Dec. 17, 1973

[21] Appl. No.: 425,127

[30] Foreign Application Priority Data

Dec. 20, 1972 Japan............................ 47-127969

[52] U.S. Cl.................................. 156/85; 28/72 FT; 28/72.17; 28/75 WT; 156/148; 156/153; 428/904

[51] Int. Cl.$^2$..................... B29C 27/00; B32B 31/00

[58] Field of Search.............. 156/84, 85, 183, 148, 156/176, 210, 243, 298, 299; 28/72, 17, 72 R, 72 FT, 72.1, 74 R, 75 WT; 161/146, 65, 88, 89, 90, 91, 97; 428/904

[56] References Cited

UNITED STATES PATENTS

| | | | |
|---|---|---|---|
| 2,401,828 | 6/1946 | Kahil.................................. | 28/74 P |
| 3,180,775 | 4/1965 | Sexsmith............................. | 156/85 |
| 3,245,863 | 4/1966 | Sonnichsen et al.................. | 156/84 |
| 3,533,902 | 10/1970 | Hoch................................... | 156/84 |
| 3,553,066 | 1/1971 | Cavalier et al...................... | 28/74 R |
| 3,622,434 | 11/1971 | Newman.............................. | 156/85 |
| 3,676,906 | 7/1972 | Eggleston............................ | 28/72.17 |
| 3,755,062 | 8/1973 | Schirmer............................. | 156/85 |
| 3,860,469 | 1/1975 | Gregorian et al................... | 156/85 |

*Primary Examiner*—William A. Powell
*Assistant Examiner*—Brian J. Leitten
*Attorney, Agent, or Firm*—Morgan, Finnegan, Pine, Foley & Lee

[57] ABSTRACT

Artificial leather having a crepe pattern is produced by a process comprising preparing a base cloth material at least a part of which is composed of highly heat shrinkable yarn and less heat shrinkable yarn, said highly heat shrinkable yarn having a heat shrinkage rate of at least 10 percent at a temperature within the range at 80° to 230°C and the difference in the heat shrinkage rate between said highly heat shrinkable yarn and said less heat shrinkable yarn being at least 5 percent within the same temperature range, forming a synthetic resin film layer on said base cloth material to obtain an artificial leather material having a smooth synthetic resin surface, and subjecting said artificial leather material to a heat treatment to form a crepe pattern on said synthetic resin film layer due to the heat shrinkage difference between said highly heat shrinkable yarn and said less heat shrinkable yarn of said part of said base cloth material.

2 Claims, No Drawings

PROCESS FOR THE PRODUCTION OF ARTIFICIAL LEATHER HAVING A CREPE PATTERN

BACKGROUND OF THE INVENTION

This invention relates to a process for the production of artificial leather having a crepe pattern, and more particularly to a process for the production of such artificial leather without using a press form.

Hitherto, as for a method of forming a relatively deep elaborate embossed pattern on artificial leather, there have been known a pressing method using embossing rolls, a method using embossed release paper to transfer the embossed pattern of the embossed release paper to the surface of the artificial leather, and a method in which artificial leather is subjected to radio heating. These methods are patterning methods which directly or indirectly require a form such as an embossing roll. Such patterning methods using a press form, however, have drawbacks in that the cost of manufacture of press forms such as rolls is high, the period of manufacture is long, pressing device and process are required, it is necessary to increase the amount of production lot in one pattern when commercial profit is taken into consideration. As a result, the non-diversified-item large-amount production system has to be adopted, this being undesirable for a method of patterning artificial leather which is a commodity requiring a diversified-item small-amount production system. Further, while the method of patterning a synthetic resin with a press form at the time of thermal melting provides easy hot embossing, and while radio heating in the case of thermoplastic resins having polar groups such as polyvinyl chloride resin is satisfactory these methods are, hardly applicable to general-purpose artificial leather-making materials such as polyurethane, polyamino acid and polyamides.

The present invention has been accomplished with the intention of overcoming such disadvantages.

It is therefore the primary object of the invention to provide an improved process for the production of artificial leather having a crepe pattern without any press form.

Another object of the invention is to provide an improved process for the production of artificial leather having a crepe pattern corresponding to a predetermined woven pattern of the basic woven fabric of the artificial leather.

Other objects and advantages of the invention will partly be self-explanatory and partly become apparent from the following detailed description of the invention.

SUMMARY OF THE INVENTION

The process for the production of artificial leather having a crepe or embossed pattern according to the invention comprises preparing a base cloth material at least a part of which is composed of highly heat shrinkable yarn and less heat shrinkable yarn, said highly heat shrinkable yarn having a heat shrinkage rate of at least 10 percent at a temperature within the range at 80° to 230°C and the difference in the heat shrinkage rate between said highly heat shrinkable yarn and said less heat shrinkable yarn being at least 5 percent within the same temperature range, forming a synthetic resin film layer on said base cloth material to obtain an artificial leather material having a smooth synthetic resin surface, and subjecting said artificial leather material to a heat treatment to form a crepe pattern on said synthetic resin film layer due to the heat shrinkage difference between said highly heat shrinkable yarn and said less heat shrinkable yarn of said part of said base cloth material.

The base cloth material may be any of woven fabrics, knitted goods and other cloth material.

In a preferred embodiment of the invention, the highly heat-shrinkable yarn is interwoven with less heat shrinkable yarn in a predetermined woven pattern so that a crepe pattern corresponding to said predetermined woven pattern may be obtained after a heat treatment. In this case, the highly heat shrinkable yarn may preferably be interwoven in a predetermined woven pattern utilizing a Dobby or Jacquard machine.

DETAILED DESCRIPTION OF THE INVENTION

The present invention is characterized in that, with attention paid to the fact that by changing the weave or knit structure of woven or knit fabrics, designs and patterns can be accurately expressed on the fabric surface. A base fabric having synthetic fiber yarns of different heat shrinkage rates locally blend-woven or blend-knitted in a suitable pattern are used to produce an artificial leather-like product, which is then heated whereby a three-dimensional pattern is reproduced on the surface due to the heat shrinkage difference between the two yarns. In this way, the present invention successfully forms an elaborate embossed or crepe pattern accurately on the artificial leather without resorting to press work.

As for raw materials for knit yarns or woven fabrics used as base fabrics for artificial leather, cellulose type natural and regenerated fibers, polyamide type, polyester type, polyacrylic type and polyvinyl chloride type fibers, other synthetic fibers and their blends are widely used. The base fabric for artificial leather is prepared by selectively using yarns of blends of synthetic and other fibers, with some of said yarns being superior and the others inferior in heat shrinkage, to produce a woven or knit fabric. Among the fibers having higher heat shrinkage rates there are polyvinyl chloride type fibers, high-shrinkage polyester type fibers and polyacrylic type fibers. Thus, according to the invention, highly heat shrinkable yarn made of a fiber superior in heat shrinkage and less heat shrinkable yarn made of a fiber which is relatively stable in respect of heat shrinkage such as cellulose type fibers are blend-woven or blend-knitted in a suitable pattern to form a base fabric for artificial leather. A synthetic resin film layer is then formed on a surface of said base fabric to produce an artificial leather-like product having a smooth surface. The artificial leather-like product thus obtained is then heated by air, water vapor or other heating medium to cause shrinkage of the base fabric, with the shrinkage difference resulting in the expression of a three-dimensional pattern on the surface of the plastic film layer.

We have conducted various tests in process of accomplishing the present inventive method described above. As a result we have found that the elaboration and accuracy of the three-dimensional pattern formed on the surface greatly vary with the shrinkability of the weaving or knitting yarn used. We have further conducted various tests about the shrinkage difference between yarns due to thermal shrinkage and also about the accuracy of the three-dimensional pattern formed on the surface. As a result, we have found that by placing restrictions such that the shrinkage rate of the higher heat shrinking yarn is 10 percent or above in the temperature range of 80° – 230°C and that the shrinkage difference between the higher and less heat shrinkable yarns is 5 percent or above within the same temperature range, it is possible to reproduce the intended pattern accurately on the artificial leather surface. That is, the criticality of the temperature range of 80° to 230°C is based on the reasons that when the yarn shrinks at temperatures below 80°C the base fabric easily shrinks and deforms under dry conditions necessary for the formation of artificial leather coatings of such general synthetic resins as polyurethane, polyamide and polyamino acid whereby the formation of films is prevented, that at temperatures above 230°C, the deterioration of natural fiber yarns which form the main body of the woven or knit structure is remarkable, and that such deterioration also tends to occur in the case of synthetic resin films. Further, the conditions that the higher heat shrinking yarn should have a shrinkage rate of 10 percent or above and that the difference in the shrinkage factor between the highly heat shrinkable yarn and the less heat shrinkable yarn should be 5 percent or above are based on the reasons that if outside these conditions a film having a thickness within the thickness range of 10 – 150μ which is the thickness of the artificial leather surface film used most generally were applied, the shrinkage of the yarn of the base fabric is small and the patten would become plain and hence an accurate pattern could not be expressed.

The process of producing an artificial leather having an embossed or crepe pattern according to the invention has been described so far. According to the process of the invention, the expression of patterns onto base fabrics may be effected extremely accurately by Dobbies, Jacquards or other means and elaborate patterns and designs can be expressed. Pattern cards are very inexpensive as compared with the cost of manufacture of the conventional press form roll and the manufacturing time is also short. As a result, the change of patterns is possible by using a small number of units as compared with the roll press method. Thus, the process according to the invention is most suitable for application to the diversified-item small-amount production system. By this method, it is possible to produce an artificial leather which is suitable for chair clothing, cushion materials, coats, hats and other clothing, bags, wall covers, etc.

PREFERRED EMBODIMENTS OF THE INVENTION

Examples of the method of the present invention will now be described.

EXAMPLE 1

Using a rayon spun yarn, 20/1, (produced by Teijin K.K.) as warp and weft and a polyvinyl chloride fiber yarn, 10/1, (Tebiron, produced by Teijin K. K.) having a shrinkage rate of 25 – 30% in the temperature range of 97° – 100°C as weft locally in an amount of 16 percent with respect to the total yarn weight, a plain-weave base fabric having a predetermined pattern was woven on a Jacquard weaving machine. 10 parts of pigment (Seikaseven E Color, produced by Dainichi Seika K. K.) was added to polyurethane elastomer paint(Rezamin ME-88, produced by Dainichi Seika K. K.) and said paint was applied to silicone coated release paper by a bar coater to form a 40μ thick film thereon. After drying of said film, an adhesive agent consisting of 100 parts of two-liquid type polyurethane (Nipporan 5033, produced by Nippon Polyurethane Kogyo K. K.) 5 parts of crosslinking agent (Collonate L, produced by Nippon Polyurethane Kogyo K. K.) and 50 parts of solvent ethyl acetate was applied in an amount of 40g/m² by a bar coater for adhesion to said plain-knit base fabric. Thereafter, it was dried at 60°C for 5 minutes, and after the complete evaporation of the solvent and the setting of the adhesive agent, said base fabric was stripped from the silicone-coated release paper. Thus, there was obtained an artificial leather-like product. The surface of this artificial leather-like product was as smooth as the surface of the release paper. The artificial leather-like product was then subjected to heat treatment in an oven at 100°C for 3 minutes. As a result, there was exhibited the average shrinkage of 30 percent locally in the direction of weft, and a three-dimensional pattern was formed on the artificial leather in relief. Thus, there was obtained an artificial leather having a three-dimensional pattern giving a superior feeling of bulkiness.

EXAMPLE 2

Using a nylon filament yarn (produced by Toray K. K.) as warp and welt and a polypropylene split yarn (600d, produced by Sekisui Kagaku K. K.) having a shrinkage rate of 15 – 60% in the temperature range of 170° – 120°C as weft locally in an amount of 20 percent with respect to the total yarn weight, a plain-weave base fabric having a predetermined pattern was woven utilizing a Jacquard weaving machine. Polyglutamic acid-γ -methyl ester was dissolved in a mixed solvent consisting of 70 parts of dichloro-ethane, 20 parts of tetrachloroethylene, and 10 parts of toluene to prepare a paint having a concentration of 10 percent, said paint being then applied to silicone release paper by an applicator bar. It was then dried at 140°C for 1 minute to form a polyamino acid resin film having a thickness of 10μ. An adhesive agent consisting of 100 parts of two-liquid type polyurethane (Nipporan 5033, produced by Nippon Polyurethane Kogyo K. K.), 5 parts of crosslinking agent (Collonate L, produced by Nippon Polyurethane K. K.) and 50 parts of solvent ethyl was applied in an amount of 100 g/m² to said film by a bar coater for adhesion to said plain-weave base fabric. It was then dried at 100°C for 3 minutes. And, after the complete evaporation of the solvent and setting of the adhesive agent, said base fabric was stripped from the silicone-coated release paper. Thus, there was obtained an artificial leather-like product. The surface of this artificial leather-like product was as smooth as the surface of the release paper. The artificial leather-like product was then subjected to heat treatment in an oven at 170°C for 3 minutes. As a result, there was exhibited an average shrinkage of 20 percent in the direction of weft and there were recesses and ridges in the pattern desired. Thus, there was obtained an artificial leather having a pattern giving a superior feeling of bulkiness.

EXAMPLE 3

Using an acetate filament yarn (100/2M, produced by Toray K. K.) as warp and weft and a polyvinyl chloride filament yarn (300d) having a shrinkage rate of 15 – 63 % in the temperature range of 110° – 160°C as warp and weft locally in an amount of 52 percent with respect to the total yarn weight, a plain-weave base fabric was blend-woven in a predetermined pattern on a Jacquard machine. Polyacryl acid ester was dissolved in ethyl acetate to prepare a paint having a concentration of 20 percent, which was then applied to polyester-coated release paper by an applicator bar and dried at 130°C for 3 minutes to form a 5μ thick acryl resin film. An adhesive agent consisting of 100 parts of two-liquid type polyurethane (Nipporan - 5032, produced by Nippon Polyurethane K. K.), 3 parts of cross-linking agent (2 parts of Collonate L and 1 part of Collonate NY-3, produced by Nippon Polyurethane K. K.) and 50 parts of methyl ethyl ketone was applied in an amount of 70g/m² to said film for adhesion to said plain-weave base fabric. Thereafter, it was dried at 70°C for 3 minutes. And after the complete evaporation of the solvent, it was left to stand at room temperature for a whole day and night. Upon completion of the setting of the adhesive agent, said base fabric was stripped from the polyester-coated release paper. Thus, there was obtained an artificial leather-like product. The surface of this artificial leather-like product was as smooth as the surface of the release paper. The artificial leather-like product was subjected to heat treatment in an oven at 130° for 5 minutes. As a result, there was exhibited an average shrinkage of 25 percent in the directions of weft and ridges in the pattern desired. Thus, there was obtained an artificial leather having a pattern giving a superior feeling of bulkiness.

EXAMPLE 4

Using a cotton spun yarn 10/1 as warp and weft and a polypropylene split yarn (600d, produced by Sekisui Kagaku K. K.) having a shrinkage rate of 15–60 percent in the temperature range of 170° – 120°C as weft locally in an amount of 11 percent with respect to the total yarn weight, a plain-weave base fabric was blend-woven in a predetermined pattern on a Jacquard machine. A polyvinyl copolymer resin adhesive agent Biniburan KL-C, produced by Nisshin Chemical Inc., Co., Ltd.) was applied in an amount of 40g/m² to said base fabric by a roll coater. On the other hand, a compound consisting of 100 parts of vinyl chloride (Geon 103 EP, produced by The Japanese Geon Co., Ltd.), 45 parts of dioctyl phthalic acid ester, 30 parts of dibutyl phthalate, 3 parts of cadmium stearate, and 5 parts of coloring agent was kneaded by calender rolls to form a 0.15mm thick sheet, which was then heat-bonded to said base fabric. Thus, there was obtained an artificial leather-like product having a substantially smooth surface. The artificial leather-like product was subjected to heat treatment in an oven at 170°C for 5 minutes. As a result, there was exhibited an average shrinkage of 30 percent locally in the direction of weft and there were recesses and ridges in the pattern desired. Thus, there was obtained an artificial leather having a pattern giving a superior feeling of bulkiness.

EXAMPLE 5

Using 70 percent of a vinylon yarn, 10/3, and 30 percent of a polyvinyl chloride fiber yarn (Teviron, produced by Teijin K. K.) having a shrinkage rate of 25–30 percent in the temperature range of 97°–100°C, a weft-knit fabric was knitted on a flat knitting machine. Then, N-methoxy-methyl-nylon was dissolved in a mixed solvent of methanol and toluene in a mixing ratio of 2:1 to prepare a paint having a concentration of 10 percent, which was then applied to polyester-coated release paper by an applicator bar and dried at 120°C for 2 minutes to form a 10μ thick nylon film. Further, an adhesive agent consisting of 100 parts of two-liquid type polyurethane (Rezamin VD-ST-10, produced by Dainichi Seika K. K.) cross-linking agent Rezamin HS-500, produced by Dainichi Seika K. K.) and 50 parts of solvent ethyl acetate was applied 120g/m² to said nylon film for adhesion to said knit base fabric. Thereafter, it was dried at 60°C for 5 minutes. After the complete evaporation of the solvent and the setting of the adhesive agent, said knit base fabric was stripped from the polyester-coated release paper. Thus, there was obtained an artificial leather-like product. The surface of the artificial leather-like product was as smooth as the surface of the release paper. The artificial leather-like product was subjected to heat treatment in an oven at 100°C for 3 minutes. As a result, there was locally exhibited an average shrinkage of 30 percent and there was seen a three-dimensional pattern in relief on the artificial leather surface. Thus, there was obtained an artificial leather giving a superior feeling of bulkiness.

What we claim is:

1. A process for the production of artificial leather having a crepe pattern comprising:
    preparing a woven fabric base cloth material which is composed of highly heat shrinkable yarn and less heat shrinkable yarn,
        said highly heat shrinkable yarn being interwoven with said less heat shrinkable yarn in a predetermined woven pattern,
        said highly heat shrinkable yarn having a heat shrinkage rate of at least 10 percent at a temperature within the range at 80° to 230°C. and the difference in the heat shrinkage rate between said highly heat shrinkble yarn and said less heat shrinkable yarn being at least 5 percent within the aforesaid temperature range,
    forming a synthetic resin film layer having a thickness within the range of 10 to 150 microns directly on and integral with the surface of said woven fabric base cloth material to obtain an artificial leather material having a smooth synthetic resin surface, and
    subjecting said artificial leather material to a heat treatment to thereby form a predetermined crepe pattern on said synthetic resin film layer due to the heat shrinkage difference between said highly heat shrinkable yarn and said less heat shrinkable yarn of said woven fabric base cloth material,
        said crepe pattern corresponding identically to said predetermined woven pattern in said base cloth material.

2. A process for the production of artificial leather having a crepe pattern as defined in claim 1, in which said highly heat shrinkable yarn is interwoven with said less heat shrinkable yarn in a predetermined woven pattern utilizing a Dobby or Jacquard weaving machine.

* * * * *